United States Patent
Ostrowski (10) Patent No.: US 9,462,071 B2
(45) Date of Patent: Oct. 4, 2016

(54) SPOOFING TECHNIQUE FOR TRANSPARENT PROXY CACHING

(75) Inventor: Martin Andrew Ostrowski, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 37 days.

(21) Appl. No.: 13/412,719

(22) Filed: Mar. 6, 2012

(65) Prior Publication Data

US 2013/0238759 A1   Sep. 12, 2013

(51) Int. Cl.
*G06F 15/16* (2006.01)
*H04L 29/08* (2006.01)
*H04L 29/12* (2006.01)

(52) U.S. Cl.
CPC ....... *H04L 67/2814* (2013.01); *H04L 61/6013* (2013.01); *H04L 67/2842* (2013.01); *H04L 61/2514* (2013.01)

(58) Field of Classification Search
CPC .................. H04L 67/2842; H04L 67/2814
USPC .......................................................... 709/219
See application file for complete search history.

(56) References Cited

U.S. PATENT DOCUMENTS

| | | | |
|---|---|---|---|
| 6,343,330 B1 | 1/2002 | Khanna et al. | |
| 6,389,462 B1* | 5/2002 | Cohen et al. | 709/218 |
| 6,463,474 B1 | 10/2002 | Fuh et al. | |
| 6,683,873 B1* | 1/2004 | Kwok | H04L 29/06 370/389 |
| 6,775,692 B1 | 8/2004 | Albert et al. | |
| 7,054,935 B2* | 5/2006 | Farber et al. | 709/226 |
| 7,161,947 B1* | 1/2007 | Desai | 370/401 |
| 7,324,515 B1 | 1/2008 | Chapman | |
| 7,372,843 B1 | 5/2008 | Asawa et al. | |
| 7,447,775 B1 | 11/2008 | Zhu et al. | |
| 7,506,054 B1 | 3/2009 | Fuh et al. | |

(Continued)

FOREIGN PATENT DOCUMENTS

WO   WO-03025697 A2   3/2003

OTHER PUBLICATIONS

Vinci, et al., "Notification of Transmittal of the International Search Report and the Written Opinion of the International Searching Authority, or the Declaration", Patent Cooperation Treaty, International Appl. No. PCT/US2013/029329, mailed Jun. 25, 2013, 8 pages, European Patent Office, Rijswijk, Netherlands.

*Primary Examiner* — Kevin Bates
*Assistant Examiner* — Nazia Naoreen
(74) *Attorney, Agent, or Firm* — Parker Ibrahim & Berg LLC; James M. Behmke; Stephen D. LeBarron (57) ABSTRACT

In one embodiment, a proxy device in a computer network receives a redirected client request having a request source address as a client address and a request source port as a client port. The proxy device then decides whether to serve, proxy, or bypass the client request, and in response to deciding to proxy the client request, forwards the client request to a corresponding server with the request source address as the client address and the request source port altered to a selected proxy port value corresponding to the proxy. In addition, the proxy device may then receive a redirected server reply for the client request that has a reply destination address as the client address and a reply destination port as the selected proxy port value, wherein the redirected server reply is received from a forwarding device based on selected proxy port value within the reply destination port.

18 Claims, 6 Drawing Sheets

(56) References Cited

U.S. PATENT DOCUMENTS

| | | |
|---|---|---|
| 7,567,560 B1 | 7/2009 | Balasubramaniyan |
| 7,673,329 B2 * | 3/2010 | Hui Hsu et al. ............... 726/6 |
| 7,864,788 B2 * | 1/2011 | Paskett ............... H04L 69/16 |
| | | 370/401 |
| 7,865,599 B2 | 1/2011 | Zhu et al. |
| 1,015,372 A1 | 6/2011 | Choudhary et al. |
| 8,127,008 B2 | 2/2012 | Manning et al. |
| 8,200,752 B2 * | 6/2012 | Choudhary et al. ......... 709/203 |
| 8,295,277 B2 | 10/2012 | Vadlakonda et al. |
| 8,605,720 B2 | 12/2013 | Vadlakonda et al. |
| 8,627,392 B1 | 1/2014 | Chapman |
| 2003/0070096 A1 | 4/2003 | Pazi et al. |
| 2003/0229809 A1 | 12/2003 | Wexler et al. |
| 2005/0044352 A1 | 2/2005 | Pazi et al. |
| 2005/0102427 A1 * | 5/2005 | Yokota et al. ............... 709/245 |
| 2006/0059092 A1 | 3/2006 | Burshan et al. |
| 2006/0069782 A1 | 3/2006 | Manning et al. |
| 2007/0233877 A1 | 10/2007 | Qu et al. |
| 2008/0225871 A1 * | 9/2008 | Paskett ............... H04L 69/16 |
| | | 370/401 |
| 2010/0235901 A1 | 9/2010 | Simpkins et al. |

* cited by examiner

SPOOFING TECHNIQUE FOR TRANSPARENT PROXY CACHING

TECHNICAL FIELD

The present disclosure relates generally to computer networks, and, more particularly, to operation of proxies in computer networks.

BACKGROUND

Internet Service Provider (ISP) networks currently carry a large amount of audio-visual media traffic. This traffic has a significant degree of duplication: a few video clips can comprise a large proportion of all media traffic. Because of the high cost network bandwidth, particularly at ISP peering points, the possibility of caching this traffic is very attractive. However, in spite of great industry interest, caching has so far not been widely deployed in this context. A major obstacle to deployment has been that caching web proxies today are typically not fully transparent. Even though a web proxy often can appear to be transparent to the client in the sense that no explicit configuration is required, it is normally not transparent to the content provider (CP), because the proxy forwards client requests to the CP with its own IP address rather than the client's. Such a proxy is said to be transparent at the application level (the application being HTTP) but not at the network level (in this case TCP/IP). The lack of network transparency means that important information about the requesting client such as location is hidden from the CP. In addition, requests that come from many clients can appear to the CP to be coming from a single source—the proxy—which makes it difficult for CPs to accurately determine the number of unique hits, and in turn reduces the CP's web advertisement revenue.

For these and other related reasons, CPs are generally opposed to caching web proxies and either block requests coming from suspected proxies, or make caching very difficult through techniques such as URL obfuscation. Therefore, ISPs considering deploying caching web proxies desire network (rather than only application) level transparency, which means among other things that requests passing through a proxy must preserve the client's source IP address. This preservation of address while intercepting the connection is called spoofing, that is, IP spoofing generally means sending an IP packet with a source IP address other than your own.

If a proxy is deployed in-line, or using a suitable redirection technology such as WCCP (Web Cache Coordination Protocol), it is possible for that proxy to spoof the source IP address and maintain network level transparency to the CP. Indeed, many popular proxies support this type of deployment. However, a problem common to all current spoofed web caching solutions is that all web traffic, both from the client to the CP and returning from the CP back to the client, must pass through the web proxy. The reason is that spoofed traffic, even though it originates from the proxy, carries the client's source IP address. Therefore, returning response traffic from the CP is destined for the client rather than the proxy, and no network entity other than the proxy is aware of the spoofing. To support spoofing, all web traffic to and from the CP must be passed through the web proxy, including flows that the proxy decides not to cache. Because the fraction of web traffic which the proxy decides to cache can be relatively small, this means that a significant portion of the proxy's processing resources can be wasted forwarding return packets that should have been routed directly to the user rather than redirected to the proxy.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a proxy device in a computer network receives a redirected client request having a request source address as a client address and a request source port as a client port. The proxy device then decides whether to serve, proxy, or bypass the client request, and in response to deciding to proxy the client request, forwards the client request to a corresponding server with the request source address as the client address and the request source port altered to a selected proxy port value corresponding to the proxy. In addition, the proxy device may then receive a redirected server reply for the client request, the server reply having a reply destination address as the client address and a reply destination port as the selected proxy port value, wherein the server reply is redirected by a forwarding device configured to detect the selected proxy port value within the reply destination port.

Moreover, according to one or more additional embodiments of the disclosure, a forwarding device (e.g., router, switch, etc.) receives a server reply for a client request, and determines whether a reply destination port of the server reply corresponds to a proxy port value. In response to detecting the proxy port value within the destination port, the forwarding device redirects the server reply to an appropriate proxy device.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others.

Figure 1:
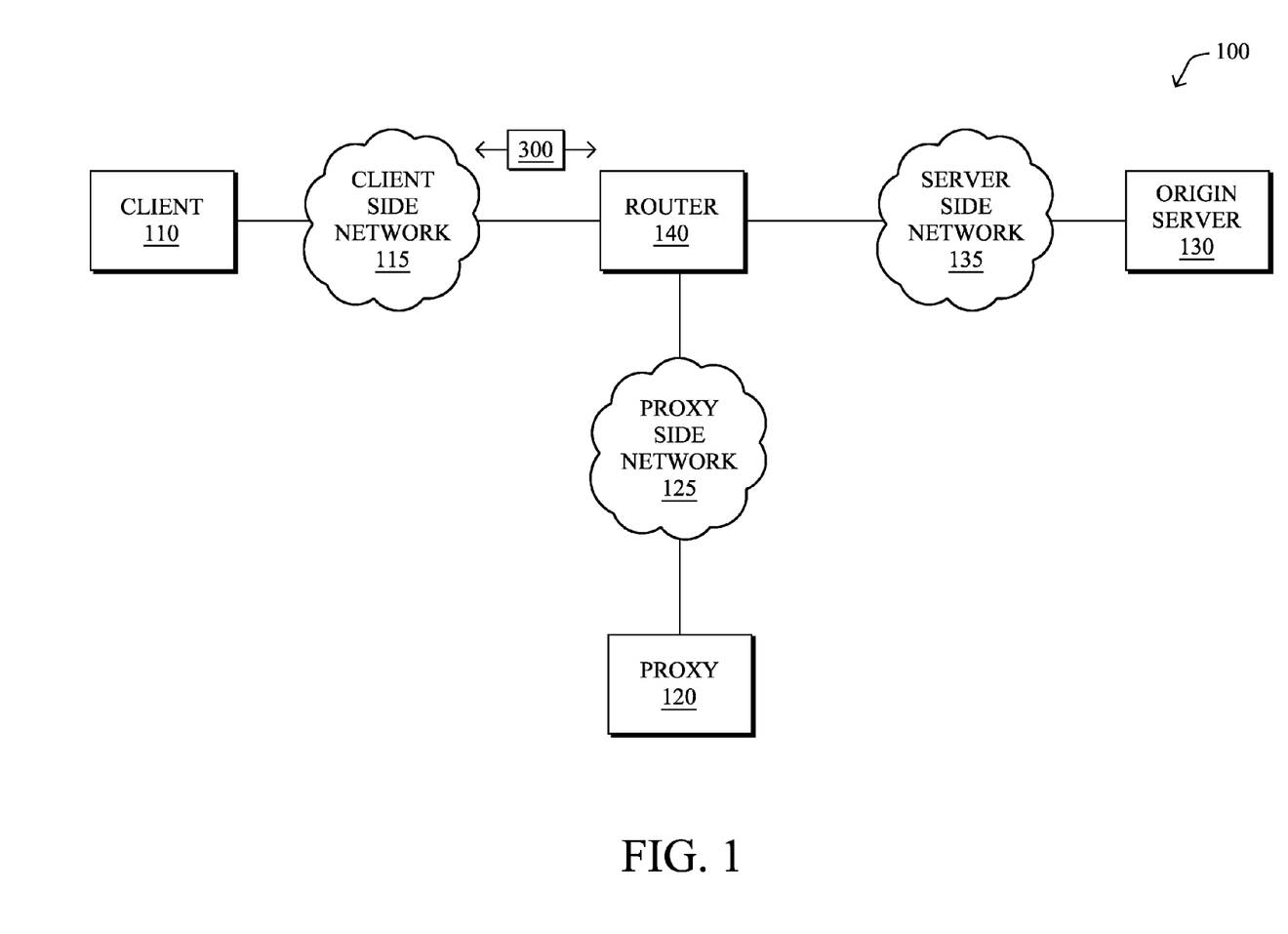
FIG. 1 illustrates an example computer network.

FIG. 1 is a schematic block diagram of an example computer network 100 illustratively comprising nodes/devices such as a client device 110, a proxy device 120, and a server 130, interconnected by a router 140 through various methods of communication, e.g., on wired or wireless links. For instance, message 300 (e.g., packets and/or frames) may be exchanged among the nodes/devices of the computer network 100 using predefined network communication protocols such as certain known wired or wireless protocols, accordingly. In this context, a protocol consists of a set of rules defining how the nodes interact with each other.

Those skilled in the art will understand that any number of nodes, devices, links, etc. may be used in the computer network, and that the view shown herein is for simplicity. In particular, in FIG. 1, client device 110 or "CLIENT" herein represents one of many clients on the client side of the router (via client side network 115), and is part of a potentially large network shared with other clients. Also, the router 140 or "ROUTER" herein represents either a single router, switch, or a logical group of routers/switches configured to divert traffic to the proxy device 120. The ROUTER is situated at the egress point to the server side of the network (server side network 125), which in practice can be the boundary between a private and public network, or a peering point between ISPs. Further, the proxy device 120 or "PROXY" herein represents either a single web caching proxy device or a web caching proxy farm. The ROUTER 140 may be configured to divert all web traffic of interest coming from the client side to the PROXY 120, based on destination port number and protocol type (described below). In today's Internet, this conventionally means at least TCP (transmission control protocol) port 80 traffic (hyper-text transmission protocol, or HTTP traffic), but can also include other protocols and ports that are candidates for caching. Lastly, the server 130 or "ORIGIN SERVER (OS)" herein represents the network entity to whose IP address client requests are sent. The OS may be a server selected from a farm, which in turn can be part of a content provider (CP) network. Note again, the logical topology shown in FIG. 1 is merely illustrative, and the techniques herein are not limited to this particular topology.

Figure 2:
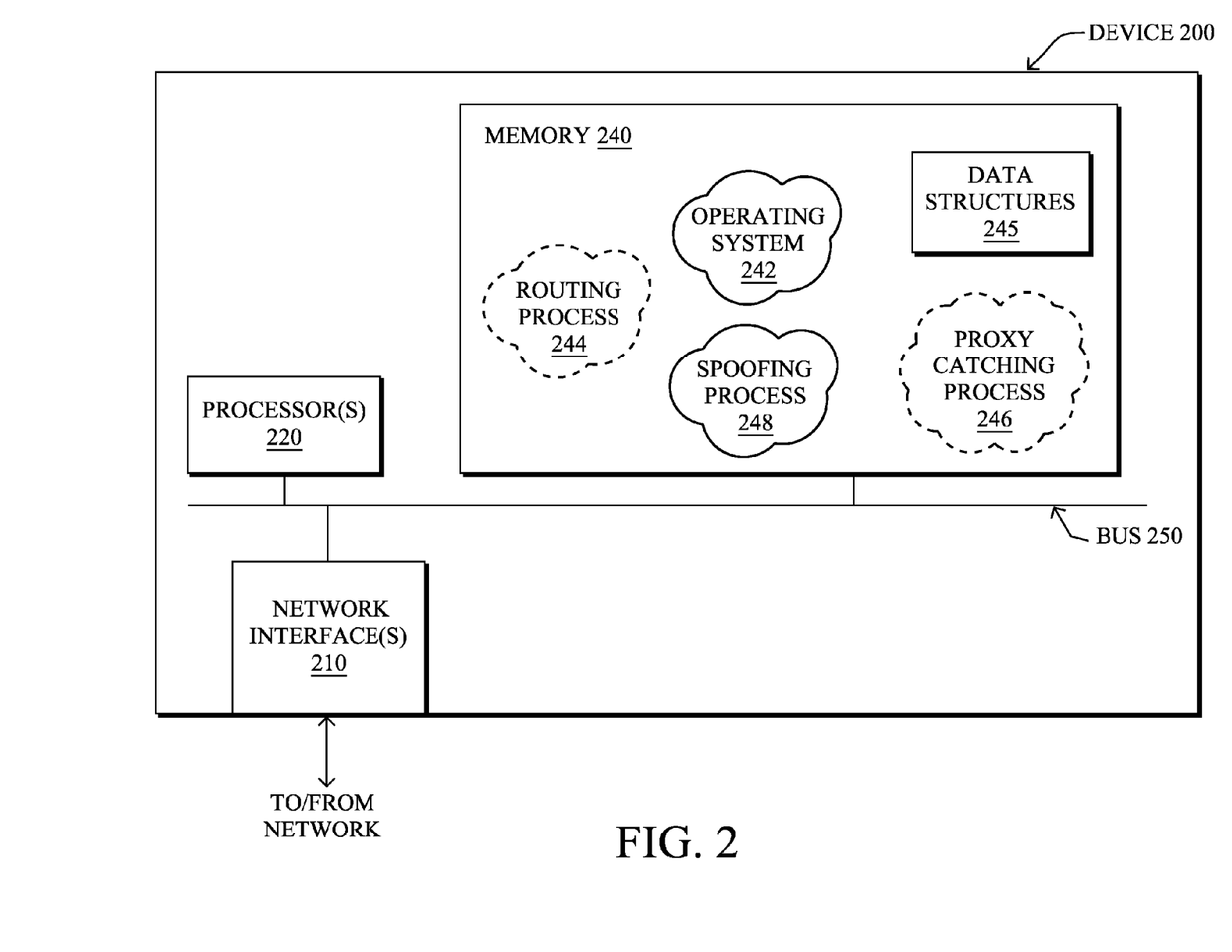
FIG. 2 illustrates an example network device/node.

FIG. 2 is a schematic block diagram of an example node/device 200 that may be used with one or more embodiments described herein, e.g., as any of the devices shown in FIG. 1 above, particularly ROUTER 140 and/or PROXY 120. The device may comprise one or more network interfaces 210, at least one processor 220, and a memory 240 interconnected by a system bus 250.

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two different types of network connections 210, e.g., wireless and wired/physical connections, and that the view is herein is merely for illustration.

The memory 240 comprises a plurality of storage locations that are addressable by the processor 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 on at least a ROUTER 140, and a proxy caching process 246 on the PROXY 120. In addition, each device may have an illustrative spoofing (sub-) process 248, as described herein. Note that while the processes are shown in centralized memory 240, alternative embodiments provide for one or more of the processes to be specifically operated within the network interfaces 210.

In particular, routing process (services) 244 (for ROUTER 140) contains computer executable instructions executed by the processor 220 to perform functions provided by one or more routing protocols, as will be understood by those skilled in the art, and as additionally described herein. For example, these functions may be configured to manage a routing/forwarding table (a data structure 245) containing, e.g., data used to make routing/forwarding decisions. Moreover, proxy process 246 (for PROXY 120) contains computer executable instructions executed by the processor 220 to perform functions provided by one or more proxying protocols, as will also be understood by those skilled in the art, and also as additionally described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, Internet Service Provider (ISP) networks currently carry a large amount of audio-visual media traffic, and this traffic has a significant degree of duplication: a few video clips can comprise a large proportion of all media traffic. Because of the high cost network bandwidth, particularly at ISP peering points, the possibility of caching this traffic is very attractive. A major obstacle to deployment, however, has been that caching web proxies today are typically not fully transparent.

There are two types of spoofing generally understood in the art. First, client IP address spoofing is where the client's IP address is spoofed to the Origin Server (OS) 130. A CLIENT 110 makes a connection destined to the OS 130, the packet is diverted to the PROXY 120, which accepts the connection and potentially makes another connection to the OS, using the client's source IP address. Second, server IP address spoofing is where the OS's response is diverted to the PROXY 120, processed, and forwarded in some form to the CLIENT with the OS's source address rather than the PROXY's source address.

There are several reasons to do IP spoofing. First is for server accounting. For instance, many servers track client connections for various purposes, including statistics and advertising. Some servers may block connections that appear to be coming through a proxy, which masks the client's IP address. A second reason is for security and/or authorization, where some web sites authorize content based on IP address, while a third reason is for geolocation, where some services attempt to locate a client based on the IP address.

The concept of TCP/IP spoofing is well established and understood, to the degree that popular web cache products commonly implement this functionality. Generally, "IP spoofing" is understood to preserve the following attributes of an IP packet: source and destination IP address, protocol, and source and destination transport layer ports, collectively known as the "5-tuple." It may optionally also preserve the TCP sequence/ACK numbers, as will be understood in the art.

Figure 3:
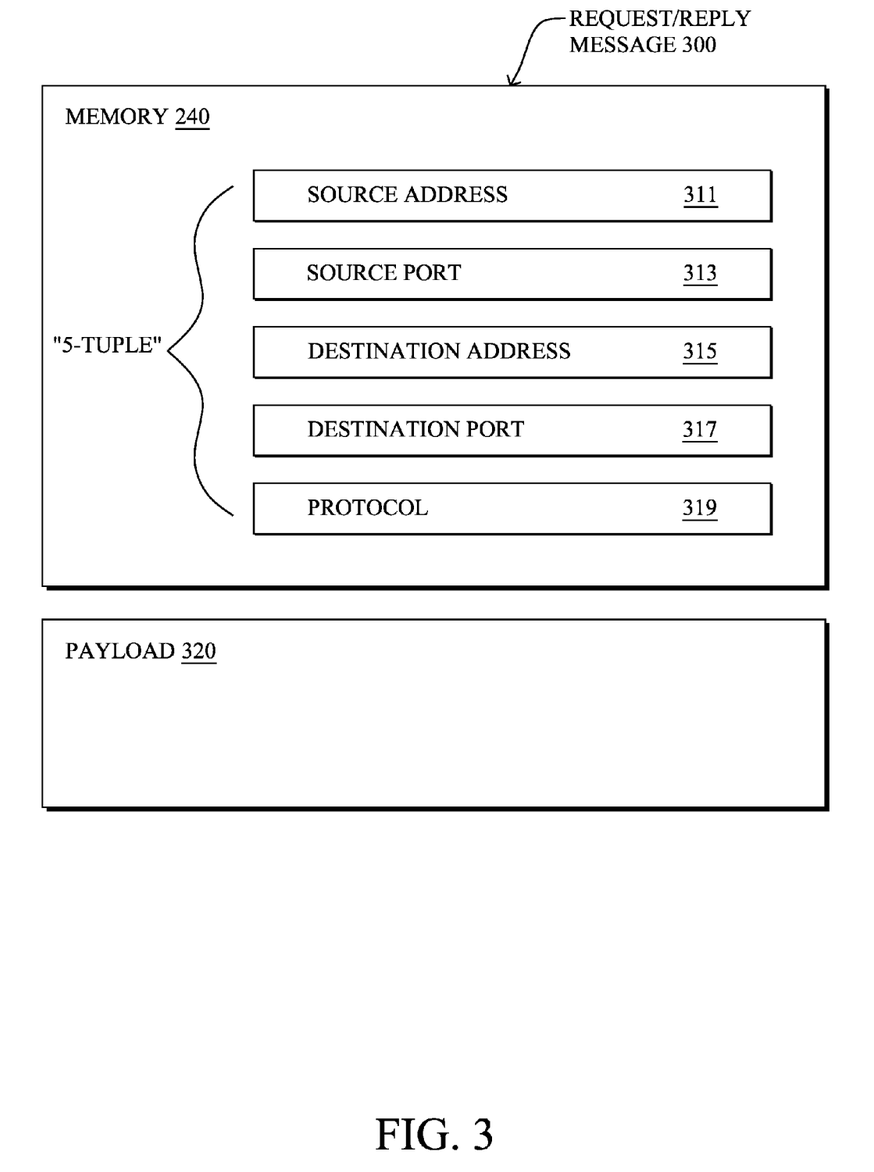
FIG. 3 illustrates an example view of a message.

FIG. 3 illustrates an example simplified message 300 (e.g., packet, frame, etc.), generally comprising a header 310 and a payload 320. Header 310 is used by network-capable devices to route/forward the message 300 and its associated payload 320, and illustratively comprises a source address 311, source port 313, destination address 315, destination port 317, and a protocol 319. Other fields, flags, labels, sub-headers, etc., may also be present, but are not shown for clarity. Accordingly, IP spoofing generally means sending an IP packet 300 with a source IP address 311 other than your own. In the context of network 100 above, it means that packets 300 passing through the PROXY 120 a) are not destined to the PROXY but the ultimate destination and b) are passed by the PROXY without modification of source or destination address (311 and 315, respectively).

Another technology related to IP spoofing is Source Network Address Translation (SNAT) address sharing with source port rewrite. The idea of using a dynamically created source port number to uniquely identify a connection sharing a single IP address with other connections passing through a SNAT device has been in use for some time. This idea arose to solve the problem that SNAT devices face in identifying which source connection sharing an IP address with others should receive a particular returning packet. The most common use of SNAT is in translating a large pool of private IP addresses used inside an enterprise network to a small pool of public IP addresses that can be used in the public Internet. Since the SNAT device typically maps many source IP addresses in the private network address space to just a few source addresses sent out to the public Internet, a single public IP address ends up being shared among several private IP addresses. The SNAT changes the source IP address of the outgoing private address to a shared public address, but it cannot determine which of these connections should receive the returning packet based on the public IP address in the response packet alone.

To solve this problem, SNAT devices generate a unique source port number (313) for each private IP source address being mapped to a shared public IP address. When a packet 300 returns from the Internet, the source port number (313), which becomes the destination port number (317) in returning packets, is used in addition to the public IP address to identify the private IP address to which the packet should be forwarded. SNAT address sharing with source port rewrite, however, is not a perfect solution, for at least the reason that it does not maintain individual source IP addresses.

The techniques herein, therefore, mark diverted web traffic by rewriting the source port to a range which uniquely identifies the proxy handling the request in the farm. The techniques are used in conjunction with port based redirection to cause only relevant returning traffic to be diverted to the proxy, while passing remaining traffic directly to the user (client) without diversion. Using the techniques herein, network transparency is still maintained, and the decision about whether to proxy a particular flow is retained in the web proxy, which are two main benefits of the current implementation of web proxy spoofing. However, only the return flows corresponding to the requests that the web cache decided to proxy are actually passed through the proxy, which reduces the forwarding burden on the proxy. Additionally, because the techniques do not require maintenance of per-flow state for the return traffic, another benefit compared to alternative approaches is greater scalability. For high traffic scenarios such as ISPs, where millions of flows are handled and maintaining per-flow state is expensive or prohibitive, this can be a significant advantage.

Illustratively, the techniques described herein may be performed by hardware, software, and/or firmware, such as in accordance with the spoofing process 248, which may each contain computer executable instructions executed by the processor 220 (or independent processor of interfaces 210) to perform functions relating to the novel techniques described herein, e.g., in conjunction with routing process 244 and/or proxy process 246, accordingly. For example, the techniques herein may be treated as extensions to conventional protocols, such as various routing protocols or proxying protocols, and as such, may be processed by similar components understood in the art that execute those protocols, accordingly.

Figure 4:
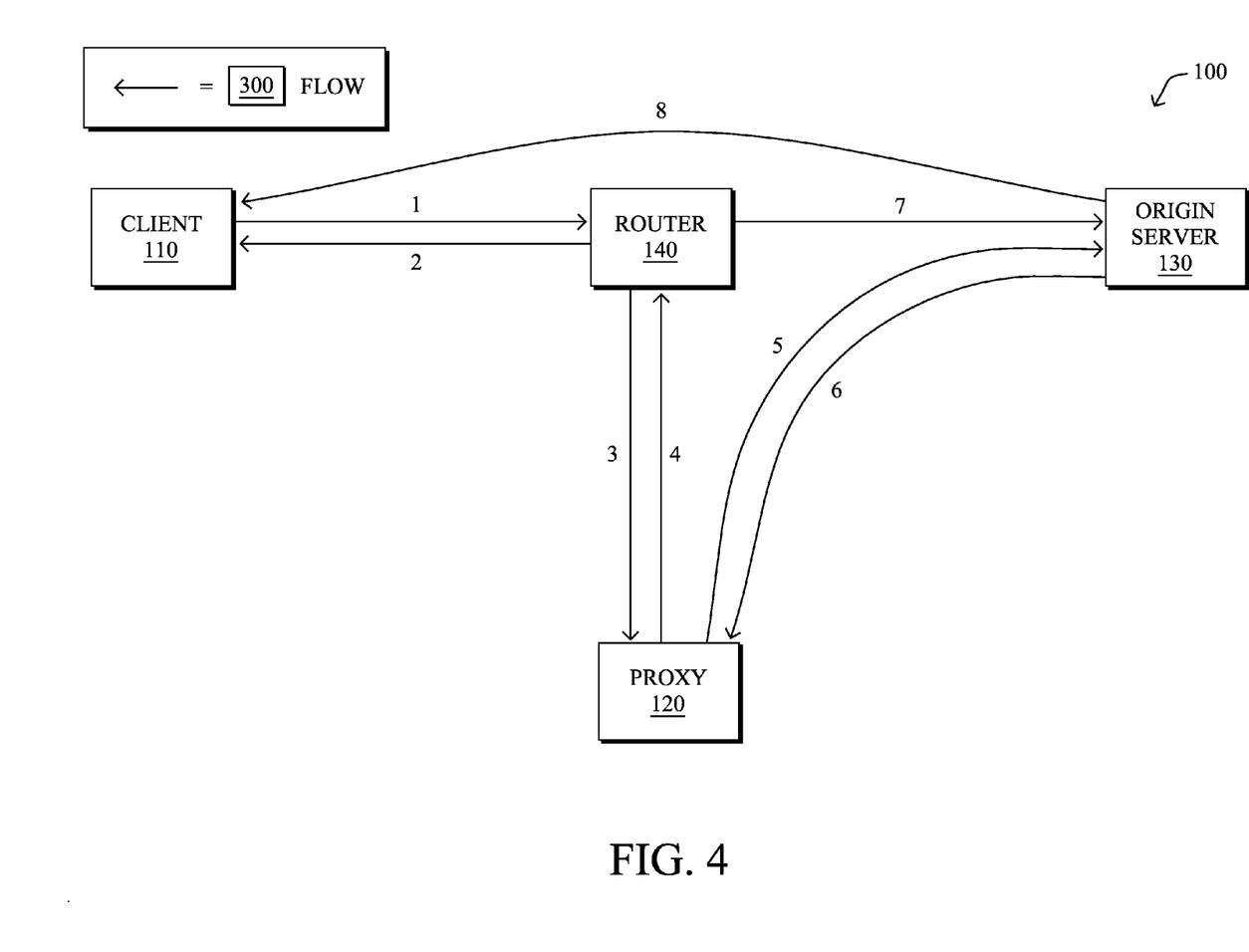
FIG. 4 illustrates examples of message passing in the computer network.

The techniques herein are described with general reference to FIG. 4, illustrating a variety of message flow options, described in detail below. Note that the diversion mechanism itself is not important to the techniques and can be vendor dependent. For example, WCCP (Web Cache Coordination Protocol) allows traffic destined to a particular port to be diverted and distributed using a hash over the IP 5-tuple to a web cache farm, and allows traffic to be forwarded to the farm using several different methods, such as layer 2 forwarding or GRE tunneling. Alternatively, a method such as PBR can be used to divert traffic destined to a port/protocol of interest to a particular proxy device. The important factor is that the diverted packet arrives at the proxy with the 5-tuple unmodified from that sent from the client.

Operationally, with reference to FIG. 4, the client (CLIENT 110) intends to send a request 300 to the content provider (CP) for a particular web object, identified by a URL (uniform resource locator). To send the request, the client must discover the address (e.g., IP address) of the ORIGIN SERVER (OS) 130, which is typically done by resolving the domain name part of the URL to an IP address through the Domain Name Service (DNS). The details of this operation are not important to the techniques herein, and will be understood by those skilled in the art. Based on the IP address, the CLIENT 110 sends a message 300 on path (1), which is received by the ROUTER 140.

The request sent from the client carries the request URL in an IP packet with the following 5-tuple:
(Source address 311: CLIENT_IP,
Source port 313: CLIENT_port,
Destination address 315: OS_IP,
Destination port 317: OS_port,
Protocol 319: Request_protocol),
where "CLIENT_IP" is the address of the client, "CLIENT_port" is the particular port of the client from which the request originated, "OS_IP" is the address of the OS from which the content is requested, "OS_port" is the particular port (e.g., TCP port 80) of the server to which the client is connecting, and "Request_protocol" is the particular protocol with which the request is being made, each as will be understood by those skilled in the art.

If the request is considered to be of interest based on the destination port 317 and is protocol 319, it matches a rule on the ROUTER and is diverted to the PROXY 120 (e.g., in general to a proxy farm or to a particular PROXY device) without modification of the 5-tuple. That is, the receiving ROUTER 140 parses request and, based on a filter match, either forwards the request to the OS (pass-through) on path (7), or to the PROXY/proxy farm on path (3).

Another diversion technique supported by the techniques herein involves Deep Packet Inspection (DPI), such as by the ROUTER 140 or else an independent in-line DPI device. The DPI device can itself be in-line with the ROUTER 140 in FIG. 4 on path (1), or several devices can comprise a farm to which the ROUTER diverts packets of interest on path (3). The role of the DPI would be to use some criteria other than that derived from the IP 5-tuple to select a particular proxy to handle the request, as may be appreciated in the art.

Using either method of diversion results in a packet with the original 5-tuple intact arriving at the PROXY 120. Other methods of diversion may also be used, provided the 5-tuple is preserved.

When the PROXY 120 receives the packet, it can decide based on some algorithm whether to serve, proxy, or bypass the request from the client, that is, either the request is already cached, or it must be retrieved from the OS, or else there is no interest in caching the request, respectively.

If the requested object is found in the PROXY (cache hit), the PROXY may decide to serve it. If so, the PROXY would spoof the OS IP address as the source address 311 in the corresponding response on path (4), so the client would believe that it is communicating with the OS 130 rather than the proxy 120. In other words, the PROXY would serve cached content while using the OS source IP address in communicating with the client, thus being transparent to the client application (e.g., since it uses a socket abstraction and does not need to worry about the source IP address, as will be understood by those skilled in the art).

If the object is not found on the PROXY (cache miss), it can either be proxied (if the traffic is intended to be cached) or bypassed (if the traffic is not to be cached). In the first case, the object must be retrieved from the OS 130 on path (5), and forwarded to the CLIENT 110 through the PROXY on path (6-4-2), while potentially storing the object on the PROXY for future requests. The request from the PROXY to the OS on path (5) has a semantically equivalent form to the original request from the client, but has the following 5-tuple:

(Source address 311: CLIENT_IP,
Source port 313: PROXY_port,
Destination address 315: OS_IP,
Destination port 317: OS_port,
Protocol 319: Request_protocol), where the altered source port 313 to "PROXY_port" is a selected proxy port value corresponding to the proxy (e.g., any value typically between 1024-65535 that allows connections to same client, as described herein).

This rewriting is a critical aspect of the embodiments herein. In this client request, network transparency is maintained to the OS because the source IP address 311 is the real address of the CLIENT 110, rather than the PROXY's IP address. The source port 313 is rewritten to be one of a group of ports that uniquely identify the PROXY and must be used in a corresponding port based diversion rule on the ROUTER 140 (explained below). The rewritten packet is then sent from the PROXY to the OS on path (5). In other words, the PROXY 120 sends a spoofed request (5) with a special port range value that may uniquely identify the PROXY (e.g., in a farm), and may also support multiple parallel connections from the CLIENT 110.

The response from the OS on path (6) ("server reply" message 300) and all subsequent packets corresponding to the response to the request will have the following 5-tuple:

(Source address 311: OS_IP,
Source port 313: OS_port,
Destination address 315: CLIENT_IP,
Destination port 317: PROXY_port,
Protocol 319: Request_protocol).

The ROUTER 140 is illustratively configured to divert all traffic coming from the server side network 135 with destination port 317 and protocol 319 corresponding to the range associated with a proxy, to that proxy, using some mechanism that does not modify the 5-tuple (typically the same mechanism that was used to divert in the forward path). This ensures that the server reply for which the client request is being proxied is sent to the correct proxy, rather than the client (path (8)) or some other proxy. Because of this, if more than one proxy is used, each proxy must have a unique identifying source port range. Note also that once a request/reply in a connection is diverted, all subsequent requests may also be diverted, since if a request is passed through to the OS after the previous one was diverted, the OS may or may not update a sequence number in the server reply (thus appears as a different flow/connection), depending on whether the file was already cached or the proxy had to fetch it from the ORIGIN_SERVER.

Note that the proxy may be configured to send a SYN message to the OS when it receives a TCP connection request from the client, and then copies the OS initial sequence number into the TCP connection back to the client as the proxy's SYN ACK response. That is, a spoofed SYN ACK would need to be sent from the PROXY to the CLIENT (e.g., if the protocol is TCP) before the actual request is sent from the client.

If the PROXY 120 decides to bypass a request rather than proxying it, it can do so simply by not rewriting the source port but rather preserving the incoming client request's 5-tuple when the request is forwarded to the ROUTER on path (5). When the response from the OS reaches the ROUTER, it will have the destination port of the client rather than the PROXY, and this response will be forwarded directly to the client on path (8) rather than being diverted back to the PROXY.

Note that the possibility exists that a request coming from a CLIENT has the same source port value as that used to identify a PROXY. In this case, if the PROXY chooses to bypass the response, the returning traffic is still sent to the PROXY rather than the client. However, the PROXY only has to forward the response traffic back to the CLIENT without modification. Such port collisions are easily detected on the PROXY, because there will not be any request state on the PROXY corresponding to the response. Provided that the pool of ports used to identify proxies is small compared to the possible range of dynamic ports, such collisions will be very infrequent and will not place a large forwarding burden on the PROXY.

The techniques herein also provide support for asymmetric routes, where the response for the OS does not go through the ROUTER that passed the original request (from CLIENT or PROXY). As long as all routers that handle returning traffic have the same rule which maps a destination port 317 on a response (server reply) to a particular proxy, the response traffic will be correctly forwarded.

Figure 5:
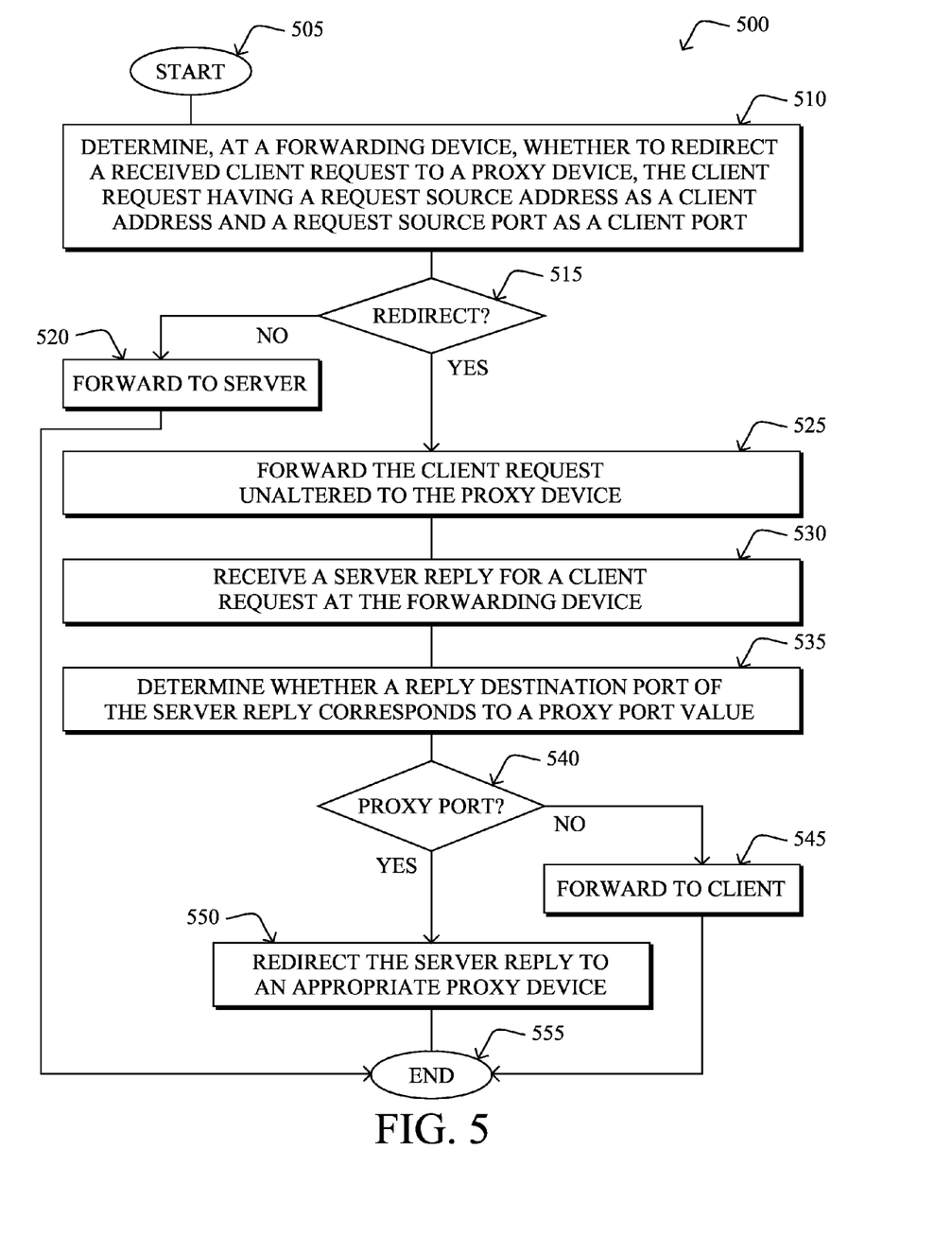
FIG. 5 illustrates an example simplified procedure for proxy caching from the perspective of a router.

FIG. 5 illustrates an example simplified procedure for a spoofing technique for transparent proxy caching in accordance with one or more embodiments described herein, particularly from the perspective of a forwarding device (e.g., ROUTER 140). The procedure 500 starts at step 505, and continues to step 510, where, as described in greater detail above, the ROUTER 140 (or other forwarding device) determines whether to redirect a received client request 300 to a PROXY 120, where the client request having at least a request source address 311 as a client address (of CLIENT 110) and a request source port 313 as a client port (also of CLIENT 110). As described above, determining whether to redirect the received client request to the proxy device may be illustratively based a request destination port 317 and a request protocol 319, and/or a deep packet inspection result. If in step 515 the ROUTER 140 decides not to redirect the request, then in step 520 the request 300 is forwarded on to the ORIGIN SERVER (OS) 130. However, if in step 515 it is decided that the client request 300 should be redirected, then in step 525 the ROUTER 140 forwards the client request unaltered (same client source is address and source port, etc.) to the PROXY 120, accordingly.

Subsequently, in step 530, the ROUTER 140 may receive a server reply 300 for a client request, and in step 535 may correspondingly determine whether a reply destination port 317 of the server reply corresponds to a proxy port value, e.g., within the specified range, as described above. (Note that any overlapping port values are handled by the PROXY.) If the decision in step 540 is that the destination port 317 of the server reply is not a proxy port value, then in step 545 the server reply is forwarded on to the appropriate CLIENT 110 (of the destination address 315). If, on the other hand, in step 540 there is a proxy port value detected within the destination port 317, then in step 550 the ROUTER redirects the server reply to an appropriate proxy device (PROXY 120). For example, as described above, the ROUTER may redirect the server reply to a particular PROXY based on the proxy port value. The procedure 500 ends in step 555.

Figure 6:
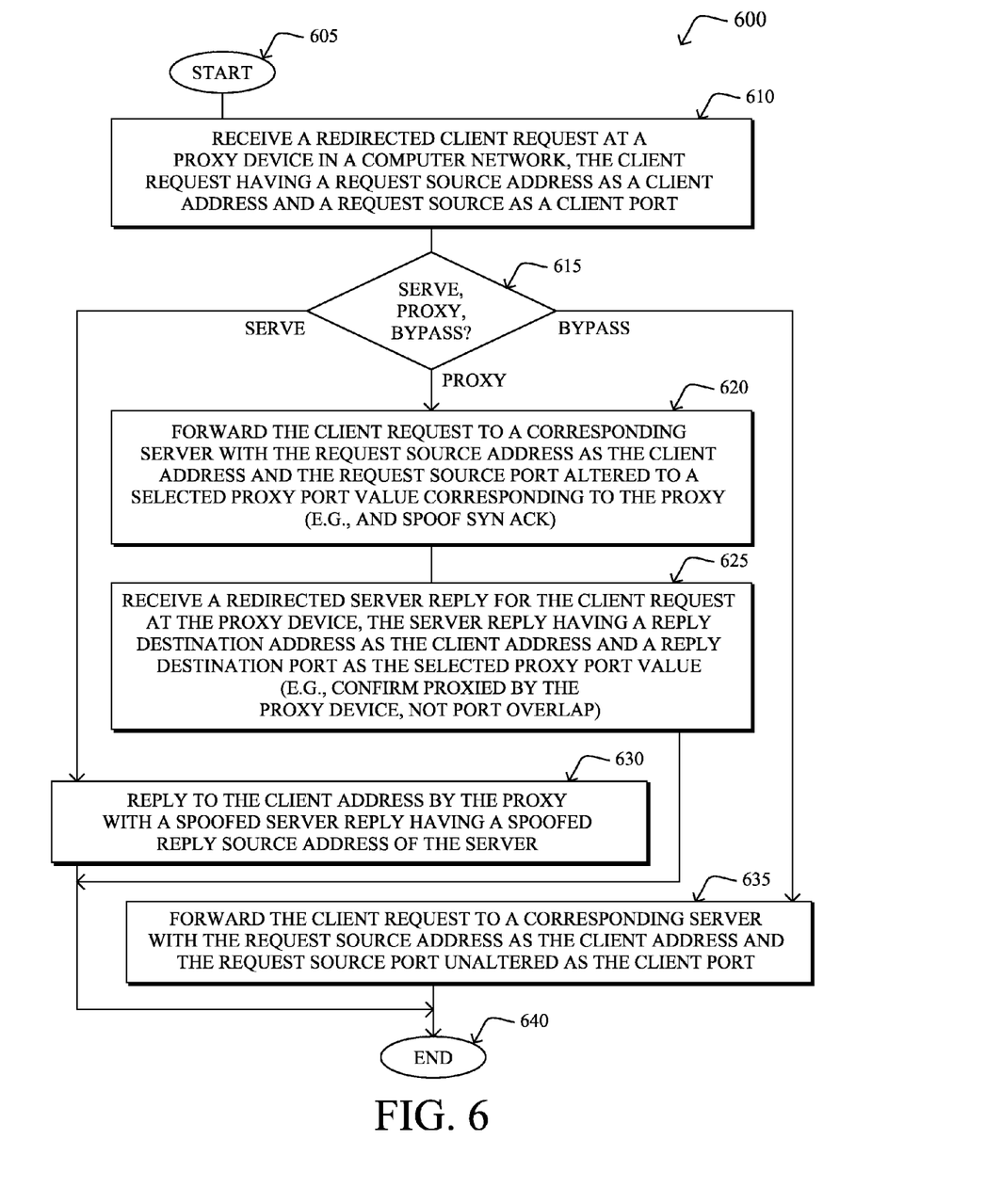
FIG. 6 illustrates an example simplified procedure for proxy caching from the perspective of a proxy device.

In addition, FIG. 6 illustrates an example simplified procedure for a spoofing technique for transparent proxy caching in accordance with one or more embodiments described herein, particularly from the perspective of a proxy device (e.g., PROXY 120). The procedure 600 starts at step 605, and continues to step 610, where, as described in greater detail above, a particular PROXY 120 may receive a redirected client request 300 that has a request source address 311 as a client address (for a CLIENT 110) and a request source port 313 as a client port (for that CLIENT 110). In step 615, the PROXY decides whether to serve the client request (e.g., cache hit), proxy the client request (e.g., cache miss), or bypass the client request (e.g., not interested). In response to deciding to proxy the client request, in step 620 the PROXY forwards the client request 300 to a corresponding server (OS 130) with the request source address 311 as the same client address and the request source port 313 altered to a selected proxy port value corresponding to the PROXY 120. Note also that when proxying the request, the PROXY may spoof a SYN ACK message to the client address (to CLIENT 110), as mentioned above. This must contain the same sequence number as the OS SYN ACK. Note also that SYN ACK is specific to TCP, while the techniques herein apply to other transport protocols.

Continuing to step 625, the PROXY 120 may then later receive a redirected server is reply 300 for the client request, where the server reply has a reply destination address 315 as the client address (for CLIENT 110) and a reply destination port 317 as the selected proxy port value (for PROXY 120). In particular, the server reply may have been redirected by a forwarding device (e.g., ROUTER 140) configured to detect the selected proxy port value within the reply destination port, as noted above. As also noted above, it is the responsibility of the PROXY 120 to confirm that the client request was proxied, and that the redirect was not improper due to a port overlap condition (that is, an overlapping port value between a client and the selected proxy port value corresponding to the proxy). For instance, upon receiving a server reply at the proxy device, the PROXY 120 may detect that the server reply was not proxied, and as such, forwards the server reply unaltered to a client corresponding to the non-proxied client request.

As alternative outputs to step 615, in response to deciding to serve the client request, in step 630 the PROXY may reply to the client address (to CLIENT 110) with a spoofed server reply 300 having a spoofed reply source address 311 of the server (OS 130). Still alternatively, in step 635 in response to deciding to bypass the client request, the PROXY may forward the client request to a corresponding server with the request source address as the client address and the request source port unaltered as the client port, accordingly. The procedure 600 illustratively ends in step 640.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The novel techniques described herein, therefore, provide a spoofing technique for transparent proxy caching. In particular, the techniques herein describe a method for routing IP traffic returning from a server either to a proxy which spoofed the request or to the client, where the routing decision is based on the rewritten destination port of the returning packet rather than state in the routing device. Current spoofing solutions require either redirecting all return traffic (spoofed or not) to the proxy, which places a large forwarding burden on the proxy, or else maintaining per-flow state on the routing device about which return flows are to be redirected, which places a large burden on the routing device handling return traffic. The techniques presented herein are stateless and do not have these drawbacks (and hence are much more scalable), since they mark return traffic to allow the ROUTER to make a simple, stateless decision about whether to send the traffic directly to the CLIENT, or to the PROXY, since the request was spoofed.

Specifically, it is important to note how the techniques herein differ from the SNAT source port technique mentioned above. Specifically, the critical conceptual differences between the SNAT technique and the embodiments herein are:

how the mapping is done between the original incoming and resulting outgoing source IP address and port at the proxy device, which network entities are identified by the mapped address and port, and how the resulting mapping is used in practice to route the returning traffic.

A device using the SNAT source port technique maps source to destination as follows: (IP_source, port_source)→(new_IP_source, new_port_source). The source IP address/port connection for a particular client is mapped to a new shared IP address with new source port number. "new_IP_source" in the SNAT techniques comes from a set of "public" IP addresses available to the SNAT device. Each "public" IP address in turn has a set of available source ports, and new_port_source is selected from this set. The mapping is stored in the SNAT device and the new_port_source is removed from the available set for that "public" IP address. The mapping is only made for the first packet in the flow, and subsequent packets reuse this mapping. When a response is received from the "public" side, the connection is readily mapped back to the original client source IP address and port using the stored mapping.

The techniques described herein, however, do not change the client's source IP address at all, since its application is in spoofing the source IP address. In addition, it is does not use a shared address/source port combination to identify a particular client, but rather a range of source ports assigned to a particular proxy to identify which traffic has been intercepted by the proxy, and which particular proxy intercepted it: (IP_source, port_source)→(IP_source, new_port_source). In this case, IP_source is preserved across the proxy, and new_port_source comes from a set of ports that uniquely belong to that proxy. Also in this case, new_port_source identifies the proxy rather than a particular client connection and a single proxy may have multiple client connections. The mapping back to the particular connection is done through the returning destination IP address and returning destination port (since a single client may have multiple connections, on different source ports). Accordingly, SNAT source port relabeling is fundamentally not applicable to transparent proxy, since all return traffic for SNAT is intended to go through the SNAT gateway by design. For transparent web proxy as described herein, however, the port relabeling is used to selectively divert some of the return traffic.

Moreover, the source port is used in conjunction with an external stateless port based forwarding technique (such as PBR) to either route the returning traffic to the correct proxy, or pass the traffic back to the client without redirecting. In this way, the source port is used to differentiate between traffic that was diverted to a web proxy from traffic that was passed through without diversion. For the case where a non-diverted connection happens to use the same source port as that which is used to identify a proxy, the proxy transparently forwards any unrecognized returning traffic to ensure the client still receives the returning traffic.

While there have been shown and described illustrative embodiments that provide a spoofing technique for transparent proxy caching, it is to be understood that various other adaptations and modifications may be made within the spirit and scope of the embodiments herein. For example, the embodiments have been shown and described herein with relation to particular protocols, and message formats. However, the embodiments in their broader sense are not as limited, and may, in fact, be used with is other suitable protocols or formats, accordingly. For instance, while the request sent from the client carries the request URL in an IP packet with the illustrative 5-tuple arrangement above, other alternative fields may be utilized, yet still allowing for the techniques described herein (e.g., changing a source port to a proxy port, while leaving a source address as a client address, regardless of the other fields of the request).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, from a router in a computer network, a redirected client request at a proxy device in the computer network, the client request having a request source address as a client address and a request source port as a client port, wherein a client from which the client request is derived is different than the proxy device and the proxy device operates as a caching proxy device;
deciding whether to serve, proxy, or bypass the client request;
in response to deciding to proxy the client request, forwarding the client request, from the proxy device, to a corresponding server with the request source address as the client address and the request source port altered, by the proxy device, to a selected proxy port value of the proxy device, wherein the proxy device marks diverted web traffic by rewriting the request source port to the selected proxy port value that is in a range of proxy port values which uniquely identifies the proxy device handling the client request, and the request source port is used in a corresponding port based diversion rule on the router; and
receiving a redirected server reply for the client request at the proxy device, the server reply having a reply destination address as the client address and a reply destination port as the selected proxy port value, wherein the redirected server reply is sent from the corresponding server and received from a forwarding device based on selected proxy port value within the reply destination port.

2. The method as in claim 1, further comprising:
in response to deciding to serve the client request, replying to the client address by the proxy with a spoofed server reply having a spoofed reply source address of the server.

3. The method as in claim 2, further comprising:
in response to deciding to bypass the client request, forwarding the client request to a corresponding server with the request source address as the client address and the request source port unaltered as the client port.

4. The method as in claim 1, further comprising:
receiving a second server reply at the proxy device for a second client request that was not proxied by the proxy device;
detecting, by the proxy device, that the second server reply was not proxied; and
forwarding the second server reply unaltered to a second client corresponding to the second client request.

5. The method as in claim 4, wherein receiving a second server reply at the proxy device for a second client request that was not proxied by the proxy device is due to an overlapping port value between the second client and the selected proxy port value corresponding to the proxy.

6. The method as in claim 1, further comprising:
spoofing a SYN ACK message to the client address from the proxy device in response to deciding to proxy the client request.

7. A method, comprising:
determining, at the forwarding device, whether to redirect a received client request to a proxy device, the client request having a request source address as a client address and a request source port as a client port, the proxy device a proxy caching device;

in response to deciding to redirect the client request, forwarding the client request unaltered to the proxy device;

receiving a server reply for the client request at a forwarding device in a computer network;

determining whether a reply destination port of the server reply, as the server reply is received, corresponds to a proxy port value altered by the proxy device in the client request received at the proxy device from the forwarding device, wherein the proxy device marks diverted web traffic by rewriting the request source port to the selected proxy port value that is in a range of proxy port values which uniquely identifies the proxy device handling the client request and the request source port is used in a corresponding port based diversion rule on the forwarding device; and in response to determining that the reply destination port of the server replay corresponds to the proxy port value, as the server reply is received, redirecting the server reply to an appropriate proxy device.

8. The method as in claim 7, further comprising: redirecting the client request to a particular proxy device.

9. The method as in claim 7, wherein determining whether to redirect the received client request to the proxy device is based on one of either a request destination port and a request protocol, or a deep packet inspection result.

10. The method as in claim 7, wherein redirecting comprises:
redirecting the server reply to a particular proxy device based on the proxy port value.

11. An apparatus, comprising:
one or more network interfaces;
a processor coupled to the network interfaces and adapted to execute one or more processes; and
a memory configured to store a process executable by the processor, the process when executed operable to:
receive from a router in the computer network a redirected client request having a request source address as a client address and a request source port as a client port, wherein a client from which the client request is derived is different than the apparatus, wherein the apparatus is a proxy caching device;
decide whether to serve, proxy, or bypass the client request;
in response to deciding to proxy the client request, forward the client request, from the apparatus, to a corresponding server with the request source address as the client address and the request source port altered, by the apparatus, to a selected proxy port value corresponding to the apparatus, wherein the apparatus marks diverted web traffic by rewriting the request source port to the selected proxy port value that is in a range of proxy port values which uniquely identifies the proxy device handling the client request and the request source port is used in a corresponding port based diversion rule on the router; and
receive a redirected server reply for the client request, the server reply having a reply destination address as the client address and a reply destination port as the proxy port, wherein the redirected server reply is sent from the corresponding server and received from a forwarding device based on selected proxy port value within the reply destination port.

12. The apparatus as in claim 11, wherein the process when executed is further operable to:

reply to the client address with a spoofed server reply having a spoofed reply source address of the server in response to deciding to serve the client request.

13. The apparatus as in claim 12, wherein the process when executed is further operable to:
forward the client request to a corresponding server with the request source address as the client address and the request source port unaltered as the client port in response to deciding to bypass the client request.

14. The apparatus as in claim 11, wherein the process when executed is further operable to:
receive a second server reply for a second client request that was not proxied;
detect that the second server reply was not proxied; and
forward the second server reply unaltered to a second client corresponding to the second client request.

15. An apparatus, comprising:
one or more network interfaces;
a processor coupled to the network interfaces and adapted to execute one or more processes; and
a memory configured to store a process executable by the processor, the process when executed operable to:
determine whether to redirect a received client request to a proxy device, the client request having a request source address as a client address and a request source port as a client port, the proxy device a proxy caching device;
in response to deciding to redirect the client request, forward the client request unaltered to the proxy device;
receive a server reply for the client request;
determine whether a reply destination port of the server reply, as the server reply is received, corresponds to a proxy port value altered by the proxy device in the client request received at the proxy device from the forwarding device, wherein the proxy device marks diverted web traffic by rewriting the request source port to the selected proxy port value that is in a range of proxy port values which uniquely identifies the proxy device handling the client request and the request source port is used in a corresponding port based diversion rule on the apparatus; and
in response to a determination that the reply destination port of the server reply corresponds to the proxy port value, as the server reply is received, redirect the server reply to an appropriate proxy device,
wherein a client from which the client request is derived is different than the proxy device and the server reply is derived from a server to which the client request was originally destined, wherein the apparatus is a network device in communication with the proxy device.

16. The apparatus as in claim 15, wherein the process when executed is further operable to:
redirect the client request to a particular proxy device.

17. The apparatus as in claim 15, wherein the process when executed determine whether to redirect a received client request to a proxy device is further operable to:
determine whether to redirect the received client request to the proxy device based on one of either a request destination port and a request protocol, or a deep packet inspection result.

18. The apparatus as in claim 15, wherein the process when executed is further operable to:
  redirect the server reply to a particular proxy device based on the proxy port value.

* * * * *

UNITED STATES PATENT AND TRADEMARK OFFICE
CERTIFICATE OF CORRECTION

PATENT NO. : 9,462,071 B2  
APPLICATION NO. : 13/412719  
DATED : October 4, 2016  
INVENTOR(S) : Martin Andrew Ostrowski Page 1 of 1

It is certified that error appears in the above-identified patent and that said Letters Patent is hereby corrected as shown below:

In the Specification

Column 3, Line 54, please amend as shown:
connections, and that the view herein is merely for Column 6, Line 59, please amend as shown:
destination port 317 and protocol 319, it matches a rule on Column 9, Line 9, please amend as shown:
request unaltered (same client source address and source Column 9, Line 54, please amend as shown:
receive a redirected server reply 300 for the client request, Column 11, Line 6, please amend as shown:
in spoofing the source IP address. In addition, it does not Column 11, Line 47, please amend as shown:
limited, and may, in fact, be used with other suitable Signed and Sealed this
Seventh Day of May, 2019

Andrei Iancu
*Director of the United States Patent and Trademark Office*